Figure 1:
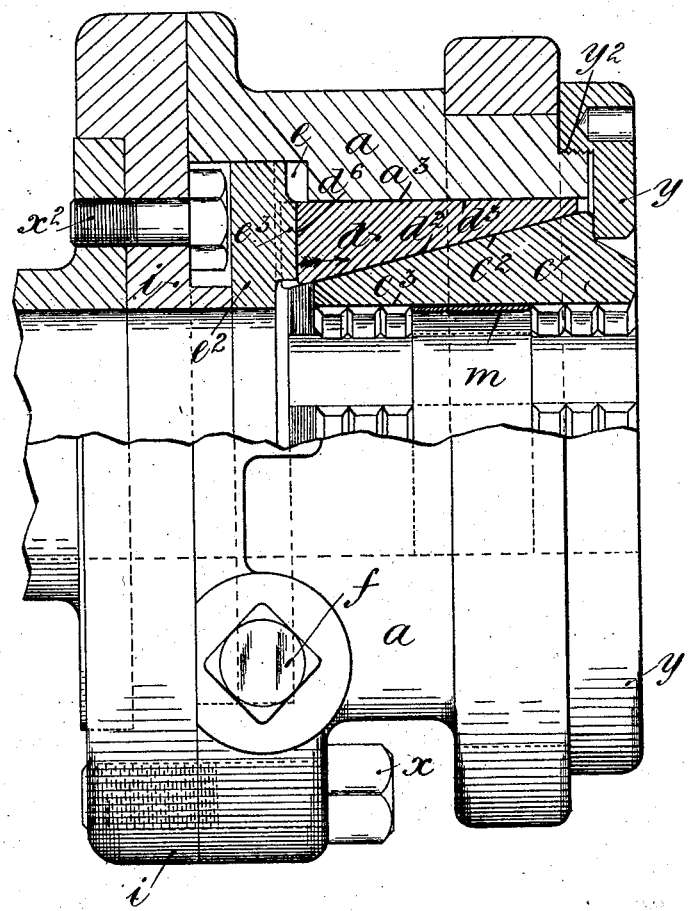

No. 815,877. PATENTED MAR. 20, 1906.
G. B. TAYLOR.
LATHE CHUCK.
APPLICATION FILED JAN. 30, 1905.

3 SHEETS—SHEET 1.

Witnesses

Inventor
George B. Taylor

No. 815,877. PATENTED MAR. 20, 1906.
G. B. TAYLOR.
LATHE CHUCK.
APPLICATION FILED JAN. 30, 1905.

3 SHEETS—SHEET 2.

Witnesses.

Inventor
George B. Taylor
By
James L. Norris.

Attys

No. 815,877. PATENTED MAR. 20, 1906.
G. B. TAYLOR.
LATHE CHUCK.
APPLICATION FILED JAN. 30, 1905.

3 SHEETS—SHEET 3.

Witnesses

Inventor
George B. Taylor

UNITED STATES PATENT OFFICE.

GEORGE BENJAMIN TAYLOR, OF BIRMINGHAM, ENGLAND.

LATHE-CHUCK.

No. 815,877.   Specification of Letters Patent.   Patented March 20, 1906.

Application filed January 30, 1905. Serial No. 243,372.

*To all whom it may concern:*

Be it known that I, GEORGE BENJAMIN TAYLOR, engineer, a subject of the King of Great Britain, residing at 43 Bartholomew street, Birmingham, in the county of Warwick, England, have invented certain new and useful Improvements in Lathe-Chucks, of which the following is a specification.

This invention is an improved lathe or like chuck particularly adapted for holding bars for machining, it being characterized by the following improved features:

The chuck-body has formed within its bore a number of axial and radial slots or recesses within which lie a number of gripping-jaws, a jaw in each slot. The jaws are adapted to move in the slots radially. The outer surface of each jaw—viz., the surface nearest the bottom of the slot or recess—is tapered in respect of the chuck's axis. Also within each slot or recess inward of the jaw is provided a wedge-shaped piece adapted to move approximately parallel with the chuck's axis. One of the faces of the wedge-shaped piece is the counterpart of the taper on the jaw aforesaid, while another face rests hard upon the bottom of the outer surface of the slot or recess, which said bottom is approximately parallel with the chuck's axis. A partly-rotatable or rotatable ring is fitted within the chuck-body inward of the wedge-shaped pieces, this ring being concentric with the chuck's axis. The rotation of this ring is adapted to move the wedge-shaped pieces collectively, it having, preferably, upon it cam-shaped pieces which operate against the backs of the wedge-shaped pieces to move the said pieces in one direction to radially move the jaws. The ring is partially rotated, preferably, by a screw applied to the body of the chuck and having between it and the said ring a loosely-applied steel piece. A spring is applied to the bore of the chuck to keep the jaws from falling out of the recesses and to help the release of the grip of the jaws on a bar, the inclines between the jaws and wedge-shaped pieces, and also between the said wedge-shaped pieces and the cam projections of the ring, being pitched most conveniently for this releasing.

A practical carrying out of the invention is represented in the drawings herewith, upon which—

Figure 2:
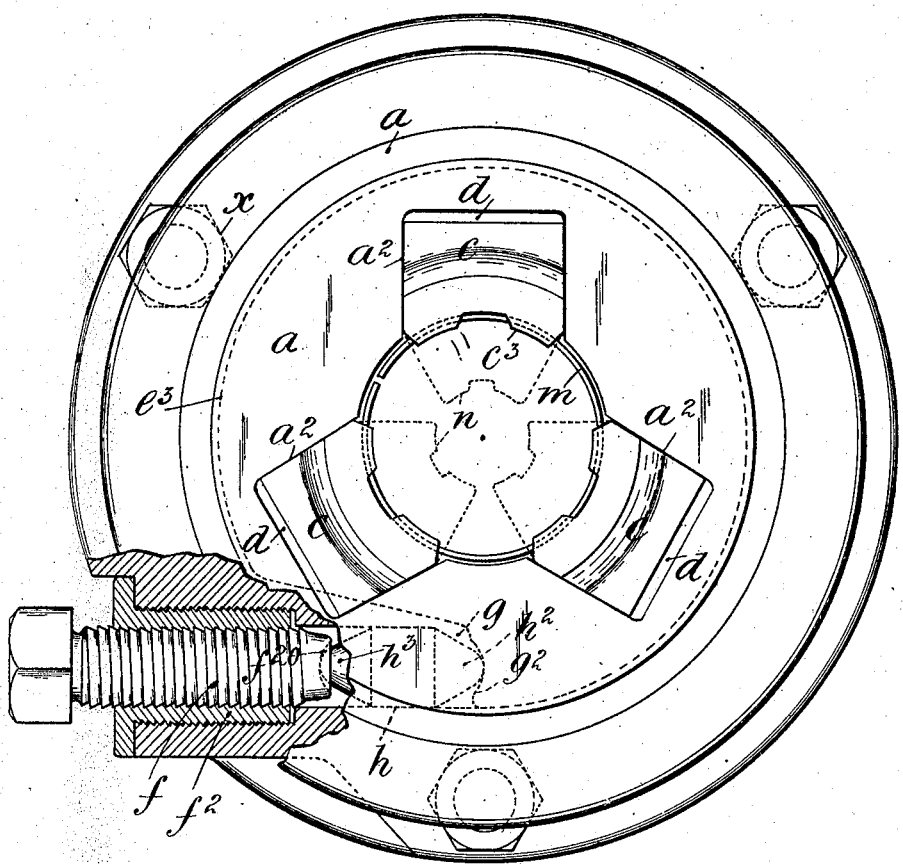
Figure 3:
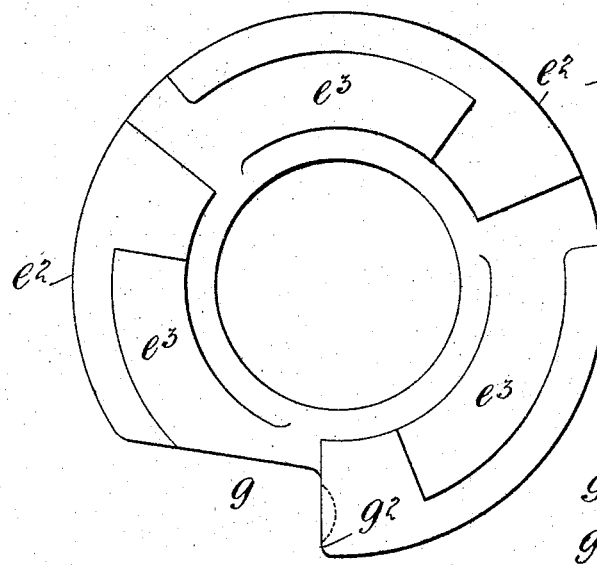
Figure 4:
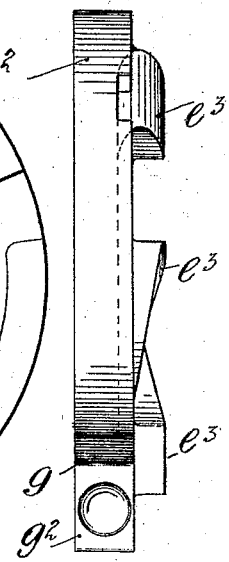
Figure 5:
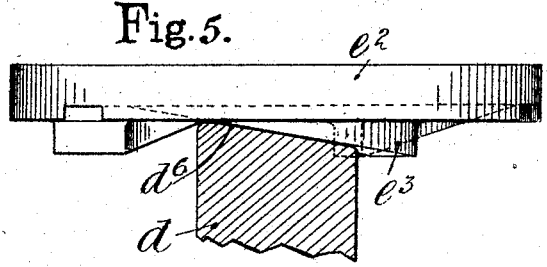

Figure 1 is a longitudinal sectional elevation; Fig. 2, a front elevation, partly in section, with the end plate removed; Fig. 3, a front elevation of the cam-ring separate, and Figs. 4 and 5 side elevations of the said cam-ring looking in different directions.

In the drawings, $a$ is the hollow cylindrical body of the chuck, in the bore of which are provided three rectangular-shaped slots or recesses $a^2\ a^2\ a^2$, arranged parallel and radially with the chuck's axis. These slots or recesses form guides or "ways" for three gripping-jaws $c\ c\ c$, which are adapted to move therein radially in respect of the center of the chuck. The outer surface $c^2$ of each jaw is tapered or inclined to the axis of the chuck, while the inner surface $c^3$ is adapted to grip the bar or article to be held by the chuck.

A wedge-shaped piece $d$ is provided in the slot or recess at the back of each gripping-jaw $c$, this wedge-shaped piece having a movement in the slot or recess parallel with the axis of the chuck. The face or surface $d^2$ of the wedge $d$ is correspondingly inclined or tapered to the taper surface $c^2$ of the jaw, while the face of surface $d^3$ is parallel with the axis of the chuck and slides hard upon the bottom $a^3$ of the slot or recess, so that when the wedge-shaped piece is moved in the said slot or recess the particular jaw it is behind is moved radially in the said slot or recess.

Within a recess $e$ in the chuck-body $a$ is loosely fitted a ring $e^2$, which has upon its one face three cam projections $e^3\ e^3\ e^3$. This ring is adapted to be partially rotated within the recess $e$, so that its cam projections work against the ends $d^6$ of the wedges $d$, these ends $d^6$ being preferably correspondingly inclined or shaped to conform to the said cam projections. The cam projections and the ends of the wedges normally touch, so that a small amount of rotation of the ring $e^2$ causes a movement of the wedges, a feature of the invention being that the whole of the wedges are moved by the ring together and at the same time.

The ring $e^2$ is partially turned in the recess $e$ by means of a screw $f$, which works through the body of the chuck, preferably at a tangent. It is deirable to use a hardened-steel bush $f^2$ in the chuck-body to provide the screw-box for the screw $f$. The ring $e^2$ is cut away at $g$ (see Figs. 2 and 3) to provide an abutment $g^2$ approximately at right angles to the axis of the screw $f$, this abutment for the one and rounded end $h^2$ of a steel piece $h$ to contact. The said abutment is formed with a semicircular recess into which the said one end $h^2$ projects, while the end of the screw $f$ is also formed with a semicircular recess $f^{20}$, into which the other and rounded end $h^3$ of the steel piece fits.

The ring $e^2$ may be prevented from any other than a rotating movement by any suitable means; but preferably a plate or adapter $i$ is provided, which is bolted to the body of the chuck at $x$ and to the lathe-spindle nose at $x^2$.

On the front end of the chuck is provided a removable plate $y$, which forms an abutment for the jaws $c$ at their forward ends, this plate being screwed to the body of the chuck at $y^2$.

A band-spring $m$ is fitted to the bore of the chuck for the purpose of forcing the jaws $c$ radially out when the pressure from the screw $f$ is released, this spring, although within the gripping-bore of the chuck, being behind the gripping-surfaces of the jaws.

To move the jaws inward to grip, the screw $f$ is operated to partially revolve the ring $e^2$, and thereby move the wedge-shaped pieces in the ways $a^2$ in the direction of the arrow, Fig. 1. Immediately the pressure from the screw is released the spring $m$ comes into action to push the wedge-shaped pieces in a direction reverse to the arrow, although the inclines between the parts by their pitch help this movement.

The gripping-jaws $c$ are interchangeable by taking off the plate $y$ and removing the springs $m$, Fig. 2, showing jaws suitable for a smaller-diameter bar.

The invention is not restricted to the particular construction and operation of the ring $e^2$, as the said ring may operate upon the wedge-shaped pieces from a screw acting within the recess in which it is provided, the said ring being either internally or externally screwed to move within or over a screwed part of the body.

Any number of gripping-jaws $c$ may be provided in the chuck-body with a like number of wedge-shaped pieces, but a single ring $e^2$.

Having now described my invention, what I claim, and desire to secure by Letters Patent, is—

In a chuck for a lathe or similar machine, the combination of a hollow cylindrical body having rectangular-shaped slots or recesses arranged parallel to and radially with respect to the chuck-axis, gripping-jaws radially slidable in the slots or recesses and having outer inclined edges, wedges disposed in the outer portions of the slots or recesses and having inner inclined edges engaging the inclined edges of the jaws, and a rotatable ring having cam projections thereon held in contact with the ends of the wedges.

In testimony whereof I have hereunto set my hand in the presence of two subscribing witnesses.

GEORGE BENJAMIN TAYLOR.

Witnesses:
 GEO. FUERY,
 H. DAVIS.